United States Patent
Xi et al.

(10) Patent No.: US 11,329,296 B2
(45) Date of Patent: May 10, 2022

(54) DISPLACEMENT ABSORPTION TUNNELS FOR CIRCULAR BEADS

(71) Applicant: GM Global Technology Operations LLC, Detroit, MI (US)

(72) Inventors: Liang Xi, Northville, MI (US); Siguang Xu, Rochester Hills, MI (US); Maddani Ramya, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 402 days.

(21) Appl. No.: 16/380,270

(22) Filed: Apr. 10, 2019

(65) Prior Publication Data
US 2020/0328431 A1  Oct. 15, 2020

(51) Int. Cl.
*H01M 8/0276* (2016.01)
*H01M 8/0258* (2016.01)

(52) U.S. Cl.
CPC ....... *H01M 8/0278* (2013.01); *H01M 8/0258* (2013.01); *H01M 8/0276* (2013.01)

(58) Field of Classification Search
CPC . H01M 8/0256; H01M 8/0276; H01M 8/0278
See application file for complete search history.

(56) References Cited

U.S. PATENT DOCUMENTS

| | | | |
|---|---|---|---|
| 2013/0193651 A1 | 8/2013 | Fracz et al. | |
| 2016/0351921 A1* | 12/2016 | Kunz | H01M 8/0258 |
| 2018/0097242 A1* | 4/2018 | Xu | H01M 8/0267 |
| 2018/0226662 A1 | 8/2018 | Yang et al. | |
| 2019/0131637 A1* | 5/2019 | Goto | H01M 8/0273 |

FOREIGN PATENT DOCUMENTS

| | | |
|---|---|---|
| DE | 102012221608 A1 | 5/2014 |
| DE | 102016002582 A1 | 8/2017 |
| EP | 1298364 A2 | 4/2003 |

\* cited by examiner

*Primary Examiner* — Maria Laios
(74) *Attorney, Agent, or Firm* — Quinn IP Law

(57) ABSTRACT

A plate includes a planar portion and a circular bead, or circular bead seal, that is offset from the planar portion. An axis is substantially perpendicular to the planar portion, and the circular bead arcs about the axis. The axis may be defined by a hole through the planar portion that is substantially surrounded by the circular bead. One or more displacement absorption tunnels is offset from the planar portion and extends radially relative to the axis. Each of the displacement absorption tunnels intersects the circular bead. In some configurations the displacement absorption tunnels may have an arcuate shape, and in some configurations the displacement absorption tunnels may have a trapezoidal shape. A plurality of plates having similar, though not identical, features may be stacked together.

20 Claims, 2 Drawing Sheets

US 11,329,296 B2

DISPLACEMENT ABSORPTION TUNNELS FOR CIRCULAR BEADS

INTRODUCTION

The present disclosure relates to stress relief structures for a circular, or largely circular, bead or bead seal in a plate assembly. Plate assemblies, including but not limited to fuel cells, employ a stack of plates that are held together and compressed. Bead seals are employed to prevent the leakage of fluids between the various plates and define a seal path.

SUMMARY

A plate, or an assembly of multiple plates, is provided. The plate includes a planar portion and a circular bead, or circular bead seal, that is offset from the planar portion. An axis is substantially perpendicular to the planar portion, and the circular bead arcs about the axis. The axis may be defined by a hole through the planar portion that is substantially surrounded by the circular bead.

One or more displacement absorption tunnels are offset from the planar portion and extends radially relative to the axis. Each of the displacement absorption tunnels intersects the circular bead. In some configurations the displacement absorption tunnels may have an arcuate shape, and in some configurations the displacement absorption tunnels may have a trapezoidal shape.

Some of the displacement absorption tunnels may be inner displacement absorption tunnels, which are interior to the circular bead, relative to the axis. Some of the displacement absorption tunnels may be outer displacement absorption tunnels, which are exterior to the circular bead, relative to the axis. One or more of the inner displacement absorption tunnels may be aligned with one of the outer displacement absorption tunnels, or none of the inner displacement absorption tunnels may be aligned with any of the outer displacement absorption tunnels.

In some configurations, the number of inner displacement absorption tunnels is greater than the number of outer displacement absorption tunnels. The inner displacement absorption tunnels and/or the outer displacement absorption tunnels may be symmetric about the axis. However, the inner displacement absorption tunnels and the outer displacement absorption tunnels may not be symmetric relative to one another.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIGS. 4A-B are schematic fragmentary plane views, taken generally from the viewpoint of line 4-4 of FIG. 2, illustrating two example shapes for the displacement absorption tunnels, with: FIG. 4A showing a trapezoidal shape; and FIG. 4B showing a rounded shape.

FIGS. 5A-D are schematic fragmentary top views illustrating possible orientations or alignments for the inner and outer displacement absorption tunnel arrays, with: FIG. 5A showing complete symmetry; FIG. 5B showing offset symmetry, in which the inner and outer displacement absorption tunnel arrays are clocked relative to one another; FIG. 5C showing unbalanced distribution of the inner and outer displacement absorption tunnel arrays, but with an incomplete circular bead seal; and FIG. 5D showing the inner and outer displacement absorption tunnel arrays at an angle to the radial direction.

DETAILED DESCRIPTION

Figure 1:
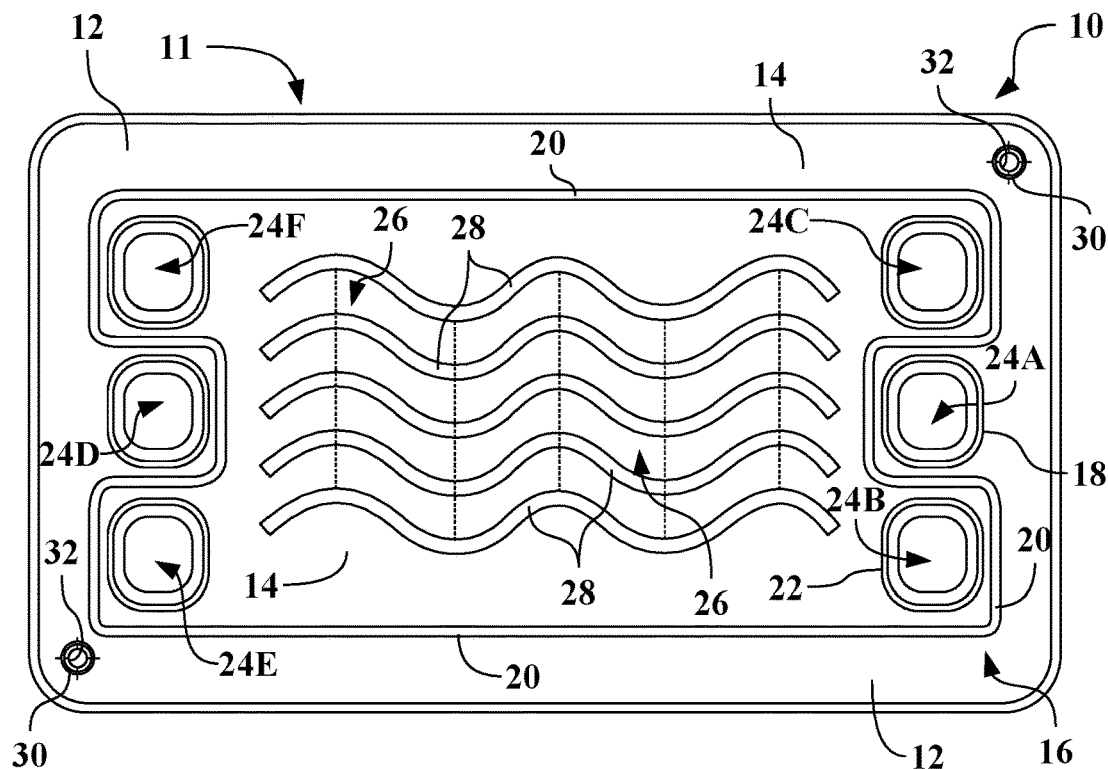
FIG. 1 is a schematic top view of a plate assembly having a plurality of plates with a plurality of bead seals formed thereon.

Referring to the drawings, like reference numbers refer to like components, wherever possible. FIG. 1 schematically illustrates a top view of a plate assembly 10. The plate assembly 10 may be part of a device 11. The device 11 may be a fuel cell, which combines a fuel such as hydrogen and an oxidant such as oxygen to generate electricity for powering various devices, including vehicles. For example, the device 11 may be an electrolyser or an electrochemical compressor system. The device 11 may take many different forms and include multiple and/or alternate components and facilities.

The plate assembly 10 includes a first plate 12 having a planar portion 14. The plate assembly 10 may also include a plurality of additional plates, similar to the first plate 12, but with some mirrored, adjusted, or alternating features.

The first plate 12 includes a plurality of elongated protuberances formed therein, referred to herein as a plurality of elongated beads or bead seals 16. The elongated bead seals 16 may be formed via a stamping operation, such that the elongated bead seals 16 are offset from the planar portion 14 of the first plate 12.

While the disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are required for operation. Any specific configurations shown in the figures are illustrative only and the specific configurations shown are not limiting of the claims or the description.

When used herein, the term "substantially" refers to relationships that are, ideally perfect or complete, but where manufacturing realties prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans would recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

Several elongated beads or bead seals are shown in FIG. 1, including a first bead seal 18, a second bead seal 20, and a third bead seal 22. Other elongated bead seals may not be numbered. As shown in FIG. 1, the first plate 12 defines a plurality of openings. In the embodiment shown, there are first through sixth openings 24A-F, however other numbers of openings may be employed.

An active area 26 receives reactants from a plurality of flow channels 28. As illustrated in FIG. 1, the first plate 12 may have a substantially rectangular shape, defining first and second plate edges. The active area 26 may be positioned between the first and second sets plate edges. Referring to FIG. 1, the plurality of flow channels 28 may define a sinusoidal shape and may be positioned such that their respective maxima and respective minima are longitudinally aligned, as shown by the dashed lines. Other arrangements employed by those skilled in the art may be used.

The configuration shown in FIG. 1 is illustrative only. Skilled artisans will recognized other configurations that may be used with the structures, techniques, or processes described herein.

As shown in FIG. 1, the first bead seal 18 may circumscribe one of the openings 24A-F, such as the first opening 24A. The third bead seal 22 may circumscribe another of the openings 24A-F, such as the second opening 24B. The second bead seal 20 may extend along an outer periphery of the first plate 12. The second bead seal 20 may circumscribe the active area 26 and at least two of the plurality of openings 24, such as the second opening 24B and the third opening 24C. The second bead seal 20 may circumscribe four of the plurality of openings (e.g., openings 24B, C, E, F) and the active area 26. The second opening 24B is encapsulated by both the second bead seal 20 and the third bead seal 22. It is understood that other arrangements employed by those skilled in the art may be used.

The first plate 12, and the additional plates, has a circular bead 30, or circular bead seal, formed thereon. The circular bead 30 surrounds a hole 32, which may be a drain hole or a hole for communication of fluids between the different plates or portions of the plate assembly 10. As used herein, circular refers to structures having a substantially circular shape, such that arcuate shapes of greater than 180-degrees may be considered circular. In some configurations, the circular bead 30 is a complete, or closed, circle—i.e., 360-degrees, as shown in FIG. 1—and in others it is less than a complete circle. Therefore, the circular bead 30 may be a curved portion of a larger seal. Note also that perfect circles are not required, and that the circular bead 30 may have an elliptical, oval, or similar shapes that are close to circular.

The elongated bead seals 16 have linear (though often waved) configurations, while the circular bead 30 may form a substantially closed loop around the hole 32, in order to seal around the hole 32. The circular bead does not extend for a long, open distance, relative to the length of the elongated bead seals 16.

Note that the location of the circular bead 30 and hole 32 is illustrative only, and that additional circular beads 30 and holes 32 may be located elsewhere in the plate assembly 10. Furthermore, note that the circular bead 30 is shown schematically in FIG. 1, and that features of, or near, the circular bead 30 may not be viewable in FIG. 1.

Figure 2:
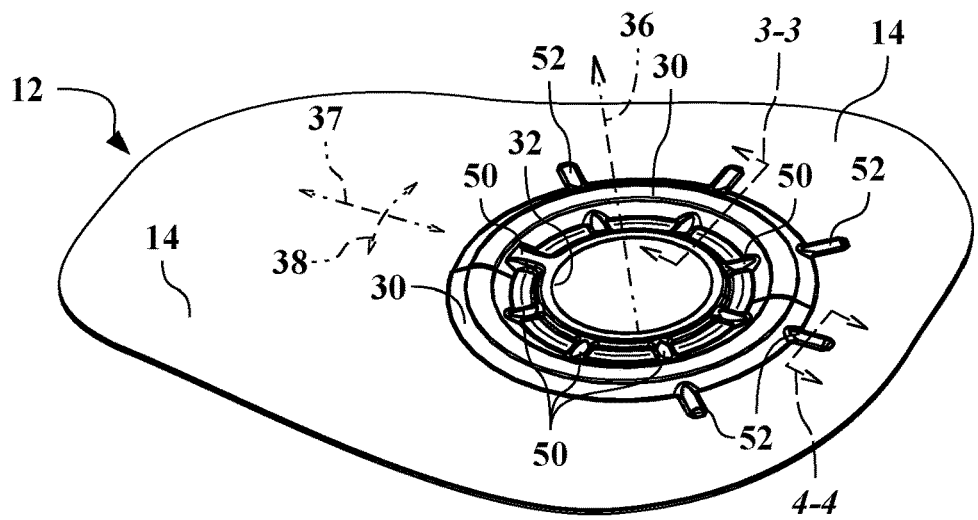
FIG. 2 is a schematic detail view of a portion of one plate of the plate assembly shown in FIG. 1, illustrating one configuration for displacement absorption tunnels surrounding a circular bead or circular bead seal.
Figure 3:
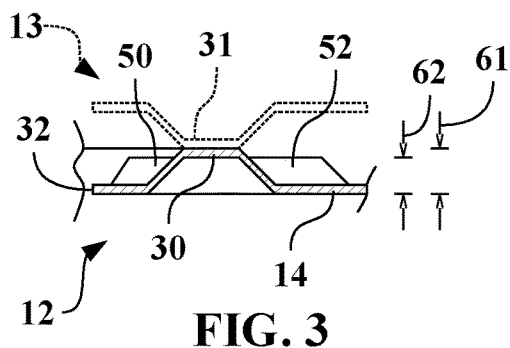
FIG. 3 is a schematic fragmentary sectional view, taken generally from the viewpoint of line 3-3 of FIG. 2, illustrating one example shape of the circular bead and relative height or spacing of the displacement absorption tunnels.

Referring also FIG. 2 and FIG. 3, there are shown additional views of portions of the plate assembly 10. FIG. 2 shows a partial view of the area around one of the circular beads 30. FIG. 3 shows a partial sectional view taken generally along the line 3-3 of FIG. 2, and illustrates one possible shape of the circular beads 30.

FIG. 2 shows that the hole 32 defines an axis 36, which is substantially central to the hole 32. Note that many similar (or mirrored) plates would be stacked in the plate assembly 10, such that each of the holes 32 in the plates would define the axis 36, or would define axes that are generally coincident with the axis 36. The circular bead 30 of FIG. 2 is illustrated as a full circle. However, partial circle beads may also be used, such that the circular bead 30 does not completely close around the hole 32. Furthermore, the circular bead 30 may define the axis about which it is located, as opposed to the hole 32 defining the axis 36, such that some configurations may not include a hole central to the circular bead 30.

Relative to the axis 36, movement in the radial direction 37 is directly perpendicular to the axis 36, and movement in the peripheral direction 38 is perpendicular to radial direction 37. Movement in the peripheral direction 38 may also be referred to as tangential movement and generally coincides with rotation about the axis 36.

The circular bead 30 is offset from the planar portion 14, and may be formed by stamping. In the plate assembly 10, portions of the circular bead 30 may be coated with a micro rubber or micro seal, such that a seal is formed between the circular bead 30 of the first plate 12 and the circular bead 30 of an adjacent plate. To improve the sealing functionality, the plates may be clamped together, such that the circular bead 30 is under pressure, with the clamping force being generally aligned along the axis 36.

Surrounding, and intersecting, the circular bead 30 is at least one displacement absorption tunnel (DAT), which is also offset from the planar portion 14. In the configuration shown in FIG. 2, there are a plurality of inner displacement absorption tunnels 50, which may individually or collectively be referred to as inner DAT 50, and a plurality of outer displacement absorption tunnels 52, which may individually or collectively be referred to as outer DAT 52.

Each inner DAT 50 is interior to the circular bead 30, relative to the axis 36, such that the inner DAT 50 extends from the circular bead 30 toward the axis 36. Each outer DAT 52 is exterior to the circular bead 30, such that the outer DAT 52 extends from the circular bead 30 away from the axis 36. In the configuration shown in FIG. 2, there are five outer DAT 52 and eight inner DAT 50, each of which intersects the circular bead 30. Note that both the inner DAT 50 are and the outer DAT 52 are substantially perpendicular to the axis 36.

FIG. 3 shows a partial section of the circular bead 30, with the inner DAT 50 and the outer DAT 52 in the background. FIG. 3 also schematically illustrates, in dashed lines, an outline of a second circular bead 31, which may be part of a second plate 13, adjacent to the circular bead 30. The seal is formed at the contact or interaction between the circular bead 30 and the second circular bead 31, which may include a micro rubber seal, or other sealing material, on the surfaces to improve sealing function between the beads. In configurations where the device 11 is a fuel cell, the first plate 12 may be an anode plate and the second plate 13 may be a cathode plate.

As best viewed in FIG. 3, the circular bead 30 is offset from the planar portion 14 by a first distance 61. The inner DAT 50 are offset from the planar portion 14 by a second distance 62, which is less than the first distance 61, and the outer DAT 52 are offset from the planar portion 14 by a third distance, which is less than the first distance 61. In the configuration shown in FIG. 3, the third distance is substantially equal to the second distance 62; however, the inner DAT 50 and the outer DAT 52 need not be offset from the planar portion 14 by the same amount. Note that none of the relative dimensions or sizes of elements shown in the figures are limiting, and that all elements are schematic.

Under compression within the plate assembly 10, the circular bead 30 may tend to buckle (i.e., portions deform inward), as it tries to expand radially (i.e., portions experience movement in the radial direction 37). However, the inner DAT 50 and the outer DAT 52 absorb or transfer some of the stress from the circular bead 30. In particular, the inner DAT 50 and the outer DAT 52 may experience movement along the peripheral direction 38. If the circular bead 30 buckles, the seal may be lost, and fluid may flow away from the holes 32. Therefore, the displacement absorption tunnels may reduce instances of the circular bead 30 buckling by reducing or relieving pressure within the circular bead 30.

Figure 4A:
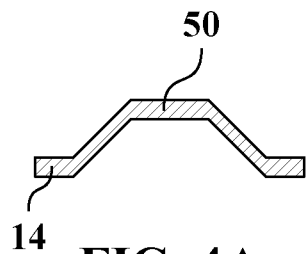
Figure 4B:
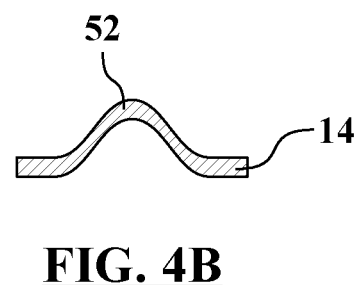

Referring also to FIGS. 4A-B there are shown schematic fragmentary plane views, taken generally from the viewpoint of line 4-4 of FIG. 2. Note that the views of FIGS. 4A-B are highly schematic, and objects not intersecting the view plane are not shown.

FIGS. 4A-B show two example shapes for the displacement absorption tunnels, including either the inner DAT 50 or the outer DAT 52. In FIG. 4A, the inner DAT 50 is illustrated having a trapezoidal shape. In FIG. 4B, the outer DAT 52 is shown having a rounded or arcuate shape.

Skilled artisans will recognize other shapes for the displacement absorption tunnels. Additionally, note that the inner DAT 50 and the outer DAT 52 may have different shapes, different dimensions, or different lengths relative to one another.

Referring also to FIGS. 5A-D, there are shown schematic fragmentary top views of some possible orientations or alignments for the inner and outer arrays of the displacement absorption tunnels. Note that FIGS. 5A-D are highly schematic, and are not full representations of all the elements around the circular bead 30 and the hole 32. Most of the example arrays shown in FIGS. 5A-D, and elsewhere in the figures, are illustrated around a full-circle circular bead 30. However, partial-circle beads may also be used, and the arrays adjusted relative thereto.

Figure 5A:
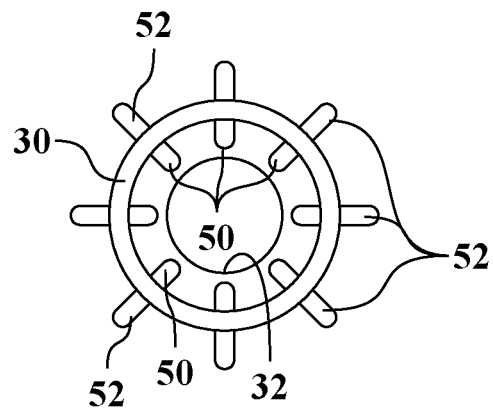

FIG. 5A shows arrays of the inner DAT 50 and the outer DAT 52 aligned with complete symmetry. Each of the inner DAT 50 is aligned with one of the outer DAT 52, and the displacement absorption tunnels are symmetrically spaced around the axis 36 at the center of the hole 32. For example, each of the inner DAT 50 and the outer DAT 52 is rotated approximately forty-five degrees from its neighbors.

Figure 5B:
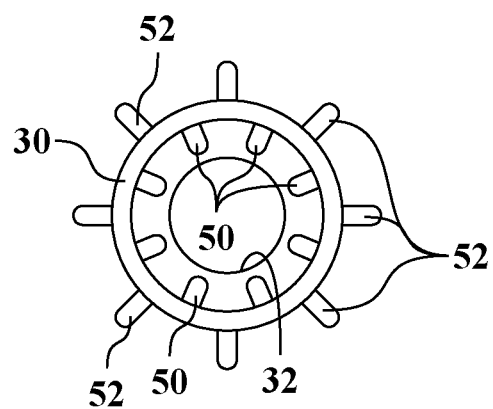

FIG. 5B shows arrays of the inner DAT 50 and the outer DAT 52 that are symmetrically spaced about the hole 32, but are offset relative to one another. In the configuration shown, the inner DAT 50 and the outer DAT 52 arrays are clocked relative to one another, such that none of the inner DAT 50 is linearly (along the radial direction) aligned with any of the outer DAT 52.

Figure 5C:
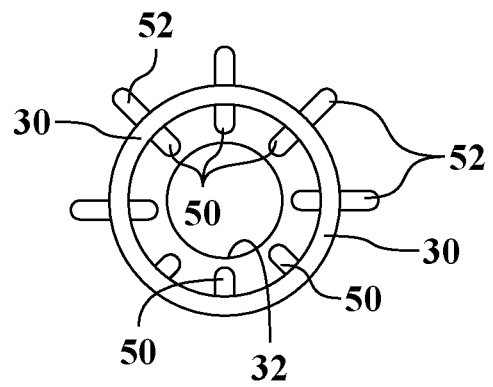

FIG. 5C shows unbalanced distribution of the inner DAT 50 and the outer DAT 52 arrays. The configuration of FIG. 5C is similar to that shown in FIG. 2. Therefore, the inner DAT 50 are symmetric about the axis 36, but the outer DAT 52 are not symmetric about the axis 36. Note that the array of FIG. 5C may also be applied to circular beads 30 that are a curved, or arcuate, portion of a larger seal.

Figure 5D:
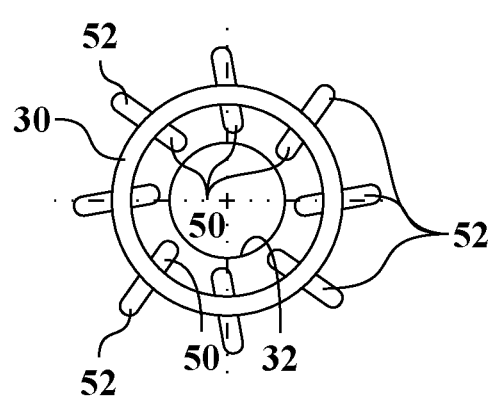

FIG. 5D shows the inner DAT 50 and the outer DAT 52 arrays at an angle to the radial direction. In each of the configurations shown in FIGS. 5A-5C, and also in FIG. 2, the inner DAT 50 and the outer DAT 52 are substantially aligned along the radial direction. However, in FIG. 5D, the inner DAT 50 and the outer DAT 52 are slanted slightly.

Note that FIGS. 5A-D illustrate the inner and outer arrays of the displacement absorption tunnels of only one plate, such as the first plate 12. However, many plates will be stacked in front of or behind (relative to the viewpoint of FIGS. 5A-5D) the arrays shown. In some configurations, the alignment of the inner and outer arrays of the displacement absorption tunnels may be the same, or mirrored, on each plate in the stack. However, in some configurations, the inner DAT 50 and the outer DAT 52 of one plate may not align with, or be the same as, the inner DAT 50 and the outer DAT 52 of an adjacent plate. For example, each of the different array configurations of FIGS. 5A-D may be used within the same plate assembly.

The detailed description and the drawings or figures are supportive and descriptive of the subject matter discussed herein. While some of the best modes and other embodiments have been described in detail, various alternative designs, embodiments, and configurations exist.

Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A plate comprising:
a planar portion;
a circular bead that is offset from the planar portion;
a hole defined through the planar portion and substantially surrounded by the circular bead, wherein the hole defines an axis that is substantially perpendicular to the planar portion;
a plurality of inner displacement absorption tunnels that are offset from the planar portion and extend radially away from the axis, wherein the inner displacement absorption tunnels intersect the circular bead and are interior to the circular bead, relative to the axis; and
a plurality of outer displacement absorption tunnels, which are exterior to the circular bead, relative to the axis;
wherein the inner displacement absorption tunnels are symmetric about the axis and spaced equidistant round the axis.

2. The plate of claim 1, wherein:
the displacement absorption tunnels have an arcuate shape.

3. The plate of claim 1, wherein:
the displacement absorption tunnels have a trapezoidal shape.

4. The plate of claim 1, wherein:
one or more of the inner displacement absorption tunnels is aligned with one of the outer displacement absorption tunnels.

5. The plate of claim 1, wherein:
none of the inner displacement absorption tunnels is aligned with any of the outer displacement absorption tunnels.

6. The plate of claim 1, wherein:
the number of inner displacement absorption tunnels is greater than the number of outer displacement absorption tunnels.

7. The plate of claim 1, wherein:
the outer displacement absorption tunnels are symmetric about the axis and spaced equidistant round the axis.

8. The plate of claim 1, wherein:
the outer displacement absorption tunnels are not symmetric about the axis.

9. The plate of claim 1, wherein:
the circular bead is offset from the planar portion by a first distance;
the inner displacement absorption tunnels are offset from the planar portion by a second distance, which is less than the first distance; and
the outer displacement absorption tunnels are offset from the planar portion by a third distance, which is less than the first distance.

10. The plate of claim 1, wherein:
the number of inner displacement absorption tunnels is greater than the number of outer displacement absorption tunnels;
the inner displacement absorption tunnels are substantially perpendicular to the axis; and
the outer displacement absorption tunnels are substantially perpendicular to the axis.

11. A plate comprising:
a planar portion;
a circular bead that is offset from the planar portion;
a hole defined through the planar portion and substantially surrounded by the circular bead, wherein the hole defines an axis that is substantially perpendicular to the planar portion;
a plurality of inner displacement absorption tunnels that are offset from the planar portion and extend radially away from the axis, wherein the inner displacement absorption tunnels intersect the circular bead and are interior to the circular bead, relative to the axis; and
a plurality of outer displacement absorption tunnels, which are exterior to the circular bead, relative to the axis;
wherein the inner displacement absorption tunnels are symmetric about the axis, and the outer displacement absorption tunnels are not symmetric about the axis.

12. The plate of claim 11, wherein:
the inner displacement absorption tunnels are substantially perpendicular to the axis, and the outer displacement absorption tunnels are substantially perpendicular to the axis.

13. The plate of claim 11, wherein:
the number of inner displacement absorption tunnels is greater than the number of outer displacement absorption tunnels;
the inner displacement absorption tunnels are substantially perpendicular to the axis; and
the outer displacement absorption tunnels are substantially perpendicular to the axis.

14. The plate of claim 11, wherein:
none of the inner displacement absorption tunnels is aligned with any of the outer displacement absorption tunnels.

15. The plate of claim 11, wherein:
the circular bead is offset from the planar portion by a first distance;
the inner displacement absorption tunnels are offset from the planar portion by a second distance, which is less than the first distance; and
the outer displacement absorption tunnels are offset from the planar portion by a third distance, which is less than the first distance.

16. The plate of claim 11, wherein:
none of the inner displacement absorption tunnels is aligned with any of the outer displacement absorption tunnels.

17. The plate of claim 11, wherein:
the number of inner displacement absorption tunnels is greater than the number of outer displacement absorption tunnels.

18. A plate assembly, comprising:
a first plate, having:
a first planar portion and a first circular bead seal offset from the first planar portion;
a first axis that is substantially perpendicular to the first planar portion, and about which the first circular bead seal arcs;
a plurality of first inner displacement absorption tunnels offset from the first planar portion and extending radially away from the first axis, wherein the first inner displacement absorption tunnels intersect the first circular bead seal toward the first axis; and
a plurality of first outer displacement absorption tunnels offset from the first planar portion and extending radially away from the first axis, wherein the first outer displacement absorption tunnels intersect the first circular bead seal opposite the first axis; and
a second plate, having:
a second planar portion and a second circular bead seal offset from the second planar portion, wherein the second circular bead seal is offset in the opposite direction from the offset of the first circular bead seal;
a second axis that is substantially perpendicular to the second planar portion and is substantially aligned with the first axis, and about which the second circular bead seal arcs;
a plurality of second inner displacement absorption tunnels offset from the second planar portion and extending radially away from the second axis, wherein the second inner displacement absorption tunnels intersect the second circular bead seal toward the second axis; and
a plurality of second outer displacement absorption tunnels offset from the second planar portion and extending radially away from the second axis, wherein the second outer displacement absorption tunnels intersect the second circular bead seal opposite the second axis,
wherein one of: the first inner displacement absorption tunnels and the second inner displacement absorption tunnels are not aligned with each other; and the first outer displacement absorption tunnels and the second outer displacement absorption tunnels are not aligned with each other.

19. The plate assembly of claim 18:
wherein the first plate further includes:
a first hole defined through the first planar portion and surrounded by the first circular bead seal, wherein the first hole defines a first axis that is substantially perpendicular to the first planar portion; and wherein the second plate further includes:
a second hole defined through the second planar portion and surrounded by the second circular bead seal, wherein the second hole defines a second axis that is substantially perpendicular to the second planar portion and is substantially aligned with the first axis.

20. The plate assembly of claim 19, wherein:
the first plate is an anode plate for a fuel cell; and
the second plate is a cathode plate for the fuel cell.

* * * * *